(12) United States Patent
Kim

(10) Patent No.: US 11,199,918 B2
(45) Date of Patent: Dec. 14, 2021

(54) DISPLAY APPARATUS WITH INTEGRATED TOUCH SCREEN

(71) Applicant: LG DISPLAY CO., LTD., Seoul (KR)

(72) Inventor: Dohyung Kim, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 108 days.

(21) Appl. No.: 16/173,629

(22) Filed: Oct. 29, 2018

(65) Prior Publication Data

US 2019/0129554 A1   May 2, 2019

(30) Foreign Application Priority Data

Oct. 30, 2017   (KR) .................. 10-2017-0142434

(51) Int. Cl.
| | | |
|---|---|---|
| G06F 3/041 | (2006.01) | |
| G02B 27/09 | (2006.01) | |
| G06F 1/16 | (2006.01) | |
| G06F 3/042 | (2006.01) | |

(52) U.S. Cl.
CPC ....... *G06F 3/0412* (2013.01); *G02B 27/0955* (2013.01); *G06F 1/1643* (2013.01); *G06F 3/041* (2013.01); *G06F 3/042* (2013.01)

(58) Field of Classification Search
CPC ........ G06F 3/0412; G06F 3/041; G06F 3/042; G06F 1/1643; G02B 27/0955
USPC .......................................... 345/173, 174, 76
See application file for complete search history.

(56) References Cited

U.S. PATENT DOCUMENTS

| | | | |
|---|---|---|---|
| 2011/0128240 A1 | 6/2011 | Choi | |
| 2014/0070350 A1 | 3/2014 | Kim et al. | |
| 2015/0220204 A1 | 8/2015 | Noguchi et al. | |
| 2015/0301782 A1* | 10/2015 | Kim | ...................... G09G 3/3208 345/1.3 |
| 2015/0367622 A1* | 12/2015 | Adachi | ................... B32B 39/00 156/759 |
| 2016/0260780 A1 | 9/2016 | Kim et al. | |
| 2016/0349904 A1* | 12/2016 | Miyake | ............... H01L 27/1225 |
| 2016/0363797 A1 | 12/2016 | Kimura et al. | |
| 2016/0378224 A1* | 12/2016 | Kwon | ..................... G06F 3/044 345/174 |
| 2017/0010493 A1 | 1/2017 | Yu | |

(Continued)

FOREIGN PATENT DOCUMENTS

| | | |
|---|---|---|
| CN | 102856348 A | 1/2013 |
| CN | 106980422 A | 7/2017 |
| JP | 2013-52569 A | 3/2013 |

(Continued)

OTHER PUBLICATIONS

Machine English Translation of JP 2013052569A, Translation dated May 4, 2020; 23 pages. (Year: 2020).*

*Primary Examiner* — Jimmy H Nguyen

(74) *Attorney, Agent, or Firm* — Birch, Stewart, Kolasch & Birch, LLP

(57) ABSTRACT

A display apparatus with integrated touch screen is provided, which has improved reliability. The display apparatus includes a pixel array layer provided on a substrate, an encapsulation layer surrounding the pixel array layer, a touch electrode layer provided on the encapsulation layer, a planarization layer provided on the touch electrode layer, an insulation layer provided on the planarization layer, and a functional film attached on the insulation layer by a film adhesive member.

18 Claims, 4 Drawing Sheets

(56) References Cited

U.S. PATENT DOCUMENTS

2017/0256593 A1   9/2017   Jung et al.

FOREIGN PATENT DOCUMENTS

| | | |
|---|---|---|
| JP | 2015-143933 A | 8/2015 |
| JP | 2017-181672 A | 10/2017 |
| KR | 10-2006-0123286 A | 12/2006 |
| KR | 10-2008-0090473 A | 10/2008 |
| KR | 10-2017-0088474 A | 8/2017 |

* cited by examiner

DISPLAY APPARATUS WITH INTEGRATED TOUCH SCREEN

CROSS-REFERENCE TO RELATED APPLICATIONS

This application claims, under 35 U.S.C. § 119, the priority benefit of the Korean Patent Application No. 10-2017-0142434 filed in the Republic of Korea on Oct. 30, 2017, which is incorporated herein by reference in its entirety into the present application.

BACKGROUND

Field

The present disclosure relates to a display apparatus with integrated touch screen.

Discussion of the Related Art

Touch screens are a type of input device which is installed in a display screen of an electronic device (or an information device) and enables a user to input information by touching the display screen with a finger, a pen, or the like while looking at the display screen.

Recently, electronic devices include a display apparatus with integrated touch screen, which includes a touch screen for sensing a user touch. Particularly, display apparatuses including an organic light emitting display panel include an in-cell touch screen where a separate touch screen is not attached on the organic light emitting display panel, and a touch electrode layer including a touch electrode and a touch line is provided on an encapsulation layer of the organic light emitting display panel. An in-cell display apparatus with integrated touch screen includes a functional film (for example, a polarizing film) attached on a planarization layer which planarizes the front surface of the touch electrode layer.

In the in-cell display apparatus with integrated touch screen, however, an adhesive force of an adhesive layer which attaches the functional film on the touch electrode layer is reduced by water, and a crack occurs in the adhesive layer due to the bending of the functional film caused by a high thermal expansion coefficient of the functional film, causing a reduction in reliability.

The above-described background is possessed by the inventor of the application for deriving the disclosure, and/or is technology information that has been acquired in deriving the disclosure. The above-described background is not necessarily known technology disclosed to the general public before the application of the disclosure.

SUMMARY

The present disclosure is directed to provide a display apparatus with integrated touch screen that substantially obviates one or more problems due to limitations and disadvantages of the related art.

An aspect of the present disclosure is directed to provide a display apparatus with integrated touch screen, which is improved in reliability.

Additional advantages and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these and other advantages and in accordance with the purpose of the disclosure, as embodied and broadly described herein, there is provided a display apparatus with integrated touch screen, the display apparatus including a pixel array layer provided on a substrate, an encapsulation layer surrounding the pixel array layer, a touch electrode layer provided on the encapsulation layer, a planarization layer provided on the touch electrode layer, an insulation layer provided on the planarization layer, and a functional film attached on the insulation layer by a film adhesive member.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Figure 1:
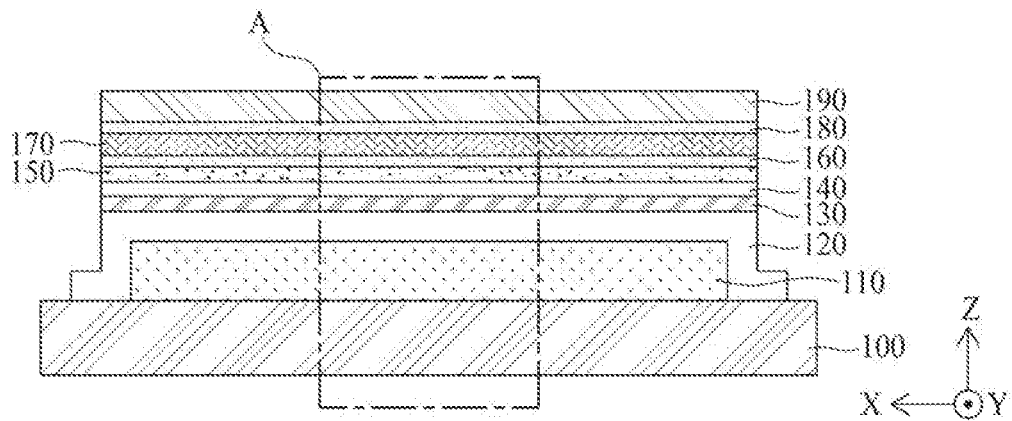
FIG. 1 is a cross-sectional view schematically illustrating a display apparatus with integrated touch screen according to an embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted.

In a case where 'comprise', 'have', and 'include' described in the present specification are used, another part can be added unless 'only~' is used. The terms of a singular form can include plural forms unless referred to the contrary.

In construing an element, the element is construed as including an error range although there is no explicit description.

In describing a position relationship, for example, when a position relation between two parts is described as 'on~', 'over~', 'under~', and 'next~', one or more other parts can be disposed between the two parts unless 'just' or 'direct' is used.

In describing a time relationship, for example, when the temporal order is described as 'after~', 'subsequent~', 'next~', and 'before~', a case which is not continuous can be included unless 'just' or 'direct' is used.

It will be understood that, although the terms "first", "second", etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Hereinafter, exemplary embodiments of a display apparatus with integrated touch screen according to the present disclosure will be described in detail with reference to the accompanying drawings. All the components of the display apparatus with integrated touch screen according to all embodiments of the present disclosure are operatively coupled and configured. In the specification, in adding reference numerals for elements in each drawing, it should be noted that like reference numerals already used to denote like elements in other drawings are used for elements wherever possible.

Figure 2:
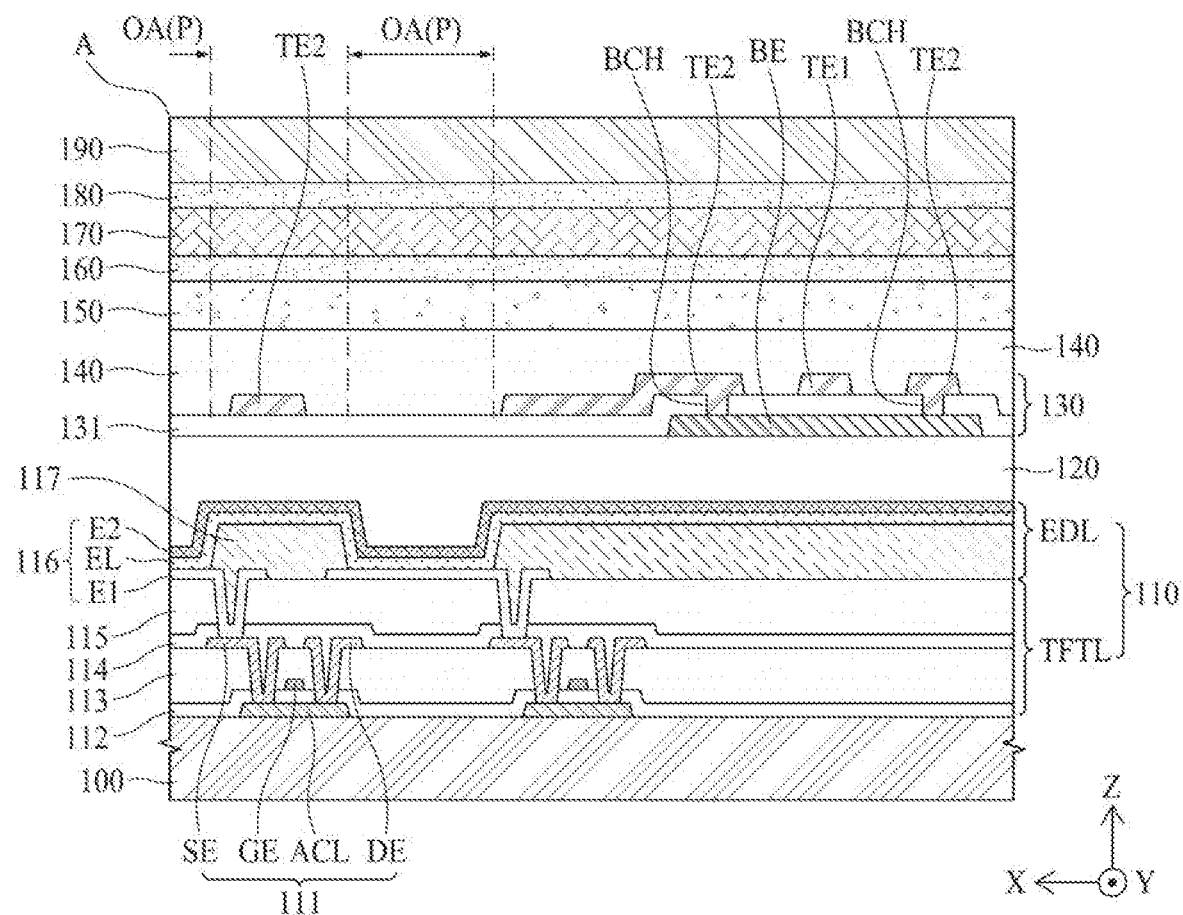
FIG. 2 is an enlarged view of a portion A illustrated in FIG. 1.

FIG. 1 is a cross-sectional view schematically illustrating a display apparatus with integrated touch screen according to an embodiment of the present disclosure, and FIG. 2 is an enlarged view of a portion A illustrated in FIG. 1.

Referring to FIGS. 1 and 2, the display apparatus with integrated touch screen according to an embodiment of the present disclosure can include a substrate 100, a pixel array layer 110, an encapsulation layer 120, a touch electrode layer 130, a planarization layer 140, an insulation layer 150, a film adhesive member 160, and a functional film 170.

The substrate 100 can be a base substrate, and for example, can include a plastic material or a glass material. When the substrate 100 includes the plastic material, the substrate 100 can include an opaque or colored polyimide material. For example, the substrate 100 including a polyimide material can be formed by curing a polyimide resin which is coated to have a certain thickness on a front surface of a release layer provided on a carrier glass substrate which is relatively thick. The carrier glass substrate can be separated from the substrate 100 by releasing the release layer through a laser release process.

Additionally, when the substrate 110 includes a plastic material, the display apparatus according to the present embodiment can further include a back plate coupled to a rear surface of the substrate 100 (the rear surface of the substrate 100 being a surface on an opposite side of the substrate 100 to a surface of the substrate 100 facing the pixel array layer 110) with respect to a thickness direction (a Z-axis direction) of the substrate 100. The back plate can maintain the substrate 100 in a planar state. The back plate according to an embodiment can include a plastic material, and for example, can include polyethylene terephthalate. The back plate can be laminated on the rear surface of the substrate 100 separated from the carrier glass substrate.

A buffer layer can be provided on one surface of the substrate 100. The buffer layer can be provided on the one surface of the substrate 100, for preventing water from penetrating into the pixel array layer 110 via the substrate 100 which is vulnerable to penetration of water. The buffer layer according to an embodiment can be formed of a plurality of inorganic layers which are alternately stacked. For example, the buffer layer can be formed of a multilayer where one or more inorganic layers of silicon oxide (SiOx), silicon nitride (SiNx), and silicon oxynitride (SiON) are alternately stacked. The buffer layer can be omitted.

The pixel array layer 110 can include a thin film transistor (TFT) layer TFTL and a light emitting device layer EDL.

The TFT layer TFTL can include a plurality of TFTs 111, a gate insulation layer 112, an interlayer insulation layer 113, a passivation layer 114, and an overcoat layer 115. Here, the TFTs 111 illustrated in FIG. 2 can each be a driving TFT connected to the light emitting device layer EDL.

The TFTs 111 can each include an active layer ACL, a gate electrode GE, a source electrode SE, and a drain electrode DE which are provided on the substrate 100 or the buffer layer. In FIG. 2, each of the TFTs 111 is illustrated as being formed in a top gate structure where the gate electrode GE is disposed on the active layer ACL, but is not limited thereto and can be a different type. In other embodiments, each of the TFTs 111 can be formed in a bottom gate structure where the gate electrode GE is disposed under the active layer ACL or a double gate structure where the gate electrode GE is disposed both on and under the active layer ACL.

The active layer ACL can be provided on the substrate 100 or the buffer layer. The active layer ACL can be formed of a silicon-based semiconductor material, an oxide-based semiconductor material, and/or the like. A light blocking layer for blocking external light incident on the active layer ACL can be provided between the buffer layer and the active layer ACL.

The gate insulation layer 112 can be provided to cover the active layer ACL. The gate insulation layer 112 can be formed of an inorganic layer, and for example, can be formed of SiOx, SiNx, or a multilayer thereof.

The gate electrode GE can be provided on the gate insulation layer 112 to overlap the active layer ACL. The gate electrode GE can protrude from a scan line provided on the gate insulation layer 112 to overlap the active layer ACL. The gate electrode GE and the scan line can each be formed of a single layer or a multilayer which includes one of molybdenum (Mo), aluminum (Al), chromium (Cr), gold (Au), titanium (Ti), nickel (Ni), neodymium (Nd), and copper (Cu), or an alloy thereof.

The interlayer insulation layer 113 can be provided on the gate electrode GE and the scan line. The interlayer insulation layer 113 can be formed of an inorganic layer, and for example, can be formed of SiOx, SiNx, or a multilayer thereof.

The source electrode SE and the drain electrode DE can be provided on the interlayer insulation layer 113 to overlap the active layer ACL with the gate electrode GE therebetween. In addition to the source electrode SE and the drain electrode DE, a data line can be provided on the interlayer insulation layer 113. Each of the source electrode SE and the drain electrode DE can be connected to the active layer ACL through a contact hole which passes through the gate insulation layer 112 and the interlayer insulation layer 113. The source electrode SE, the drain electrode DE, and the data line can each be formed of a single layer or a multilayer which includes one of Mo, Al, Cr, Au, Ti, Ni, Nd, and Cu, or an alloy thereof.

The passivation layer 114 can be provided to cover the source electrode SE, the drain electrode DE, and the data line. The passivation layer 114 can insulate the TFTs 111. The passivation layer 114 can be formed of an inorganic layer, and for example, can be formed of SiOx, SiNx, or a multilayer thereof.

The overcoat layer 115 can be provided to cover the passivation layer 114. The overcoat layer 115 can planarize a step height of an upper surface of the passivation layer 114 caused by each of the TFTs 111. The overcoat layer 115 can be formed of an organic layer such as acryl resin, epoxy resin, phenolic resin, polyamide resin, polyimide resin, or the like.

The light emitting device layer EDL can be provided on the TFT layer TFTL. The light emitting device layer EDL can include a light emitting device 116 and a bank 117.

The light emitting device 116 and the bank 117 can be provided on the overcoat layer 115.

The light emitting device 116 according to an embodiment can emit light by a light emitting layer EL emitting light based on a data signal supplied from the driving TFT 111 of the TFT layer TFTL. The light emitting device 116 can include a first electrode E1, a light emitting layer EL, and a second electrode E2. The first electrode E1 can be defined as an anode electrode, and the second electrode E2 can be defined as a cathode electrode.

The first electrode E1 can be formed on the overcoat layer 115. The first electrode E1 can be connected to the source electrode SE of the driving TFT 111 through a contact hole which passes through the passivation layer 114 and the overcoat layer 115. The first electrode E1 can include a metal material, which is high in reflectivity. For example, the first electrode E1 can be formed in a multilayer structure such as a stacked structure (Ti/Al/Ti) of Al and Ti, a stacked structure (ITO/Al/ITO) of Al and ITO, an APC (Ag/Pd/Cu) alloy, or a stacked structure (ITO/APC/ITO) of an APC alloy and ITO, or can include a single-layer structure including one material or two or more alloy materials selected from among Ag, Al, Mo, Au, Mg, calcium (Ca), and barium (Ba).

The bank 117 can be provided on the overcoat layer 115 to cover an edge of the first electrode E1 and can provide an opening area OA(P) on the first electrode E1. The bank 117 can be disposed between first electrodes E1 of adjacent pixels P and can act as a pixel defining layer which defines an opening area OA(P) of each of a plurality of pixels P.

The light emitting layer EL can be provided to cover the first electrode E1 and the bank 117 and can be a common layer which is provided in common in the plurality of pixels P. The light emitting layer EL can include one of an organic light emitting layer, an inorganic light emitting layer, and a quantum dot light emitting layer, or can include a stacked or mixed structure of an organic light emitting layer or an inorganic light emitting layer and a quantum dot light emitting layer.

The light emitting layer EL according to an embodiment can include two or more light emitting parts for emitting white light. For example, the light emitting layer EL can include a first light emitting part and a second light emitting part for emitting the white light based on a combination of first light and second light. Here, the first light emitting part can emit the first light and can include one of a blue light emitting part, a green light emitting part, a red light emitting part, a yellow light emitting part, and a yellow-green light emitting part. The second light emitting part can include a light emitting part emitting light having a complementary color relationship among a blue light emitting part, a green light emitting part, a red light emitting part, a yellow light emitting part, and a yellow-green emitting part.

The second electrode E2 can be provided on the light emitting layer EL. The second electrode E2 can be provided to cover the light emitting layer EL. The second electrode E2 can be a common layer which is provided in common in the pixels P. The second electrode E2 according to an embodiment can be formed of a transparent conductive material capable of transmitting light, and for example, can be formed of metal oxide, such as indium tin oxide (ITO) or indium zinc oxide (IZO), or a composition of oxide and metal such as ZnO:Al or SnO$_2$:Sb.

The plurality of pixels P can be provided in an area where the light emitting device layer EDL is provided, and thus, the area where the light emitting device layer EDL is provided can be defined as a display area. An area around the display area can be defined as a non-display area. The light emitting device layer EDL can emit light according to a data signal supplied through the first electrode E1 from the driving TFT 111 of the TFT layer TFTL. At this time, light emitted from the light emitting device layer EDL can be transmitted towards the functional film 170.

The plurality of pixels P according to an embodiment can be arranged in a stripe structure in the display area. In this case, each of the plurality of pixels P can include a red subpixel, a green subpixel, and a blue subpixel, and moreover, can further include a white subpixel.

According to another embodiment, the plurality of pixels P can be arranged in a pentile structure in the display area. In this case, each of the plurality of pixels P can include one red subpixel, two green subpixels, and one blue subpixel, which are one-dimensionally arranged in a polygonal form. For example, each of the pixels P having the pentile structure can include one red subpixel, two green subpixels, and one blue subpixel, which are one-dimensionally arranged in an octagonal form. In this case, the blue subpixel can have a largest size, and each of the two green subpixels can have a smallest size.

Additionally, the display apparatus with integrated touch screen according to an embodiment of the present disclosure can further include a scan driving circuit provided in a non-display area of the substrate 100. The scan driving circuit can generate a scan pulse according to a scan control signal and can supply the scan pulse to a corresponding scan line in a predetermined order. The scan driving circuit according to an embodiment can be provided in the non-display area of the substrate 100 along with the TFTs.

The encapsulation layer 120 can be provided to surround the pixel array layer 110. The surrounding of the pixel array layer 110 by the encapsulation layer 120 can be such that the pixel array layer 110 is completely surrounded, as shown in FIG. 1 for example, by having one surface of the pixel array layer 110 covered by the substrate 100 and all other surfaces of the pixel array layer 110 covered by the encapsulation layer 120. The encapsulation layer 120 protects the light emitting device layer EDL and the like from an external impact and prevents oxygen, water, and/or particles from penetrating into the light emitting layer EL and the second electrode E2 of the light emitting device layer EDL. The encapsulation layer 120 can include at least one inorganic layer.

The encapsulation layer 120 according to an embodiment can include a first inorganic encapsulation layer, an organic encapsulation layer, and a second inorganic encapsulation layer.

The first inorganic encapsulation layer can be provided on the substrate 100 to surround the pixel array layer 110. The first inorganic encapsulation layer according to an embodiment can include one inorganic material of SiOx, SiNx, SiON, titanium oxide (TiOx), and aluminum oxide (AlOx).

The organic encapsulation layer can be provided on the substrate 100 to cover the first inorganic encapsulation layer. The organic encapsulation layer can have a thickness which is relatively thicker than the first inorganic encapsulation layer, for preventing particles from penetrating into the light emitting device layer EDL via the encapsulation layer 120. The organic encapsulation layer can be formed of one organic material of acryl resin, epoxy resin, phenolic resin, polyamide resin, polyimide resin, and benzocyclobutene resin. For example, the organic encapsulation layer can be formed of epoxy resin.

The second inorganic encapsulation layer can be provided on the substrate 100 to cover the organic encapsulation layer. The second inorganic encapsulation layer according to an embodiment can be formed of the same inorganic material as that of the first inorganic encapsulation layer.

The touch electrode layer 130 can be provided on the encapsulation layer 120. The touch electrode layer 130 according to an embodiment can include a plurality of bridge electrodes BE, a touch insulation layer 131, a plurality of first touch electrodes TE1, and a plurality of second touch electrodes TE2. The touch electrode layer 130 can optionally also further comprise a touch buffer layer on the encapsulation layer 120.

The bridge electrodes BE can be provided on the encapsulation layer 120 or the touch buffer layer. That is, the bridge electrodes BE can be respectively provided in a plurality of bridge electrode areas which are defined on the encapsulation layer. The bridge electrodes BE can have a single-layer structure or a multilayer structure including a metal material. For example, the bridge electrodes BE can have a single-layer structure or a multilayer structure including a metal material such as Mo, Ag, Ti, Cu, Al, Ti/Al/Ti, or Mo/Al/Mo. The bridge electrodes BE can be disposed to overlap the bank 117 so as to prevent the opening area OA of each pixel P from being reduced.

The touch insulation layer 131 can be provided on the encapsulation layer 120 or the touch buffer layer to surround the bridge electrodes BE. A bridge contact hole BCH can be provided in the touch insulation layer 131 overlapping both edges of each of the bridge electrodes BE. The touch insulation layer 131 according to an embodiment can be formed of an inorganic layer, and for example, can be formed of SiOx, SiNx, or a multilayer thereof.

The first touch electrodes TE1 can be provided on the touch insulation layer 131 overlapping each of a plurality of first touch electrode areas defined on the encapsulation layer 120. Here, the first touch electrode areas can be spaced apart from one another in a first direction X. The first direction can be a direction parallel to the scan line or the data line provided on the pixel array layer 110.

The second touch electrodes TE2 can be provided on the touch insulation layer 131 overlapping each of a plurality of second touch electrode areas defined on the encapsulation layer 120. Here, the second touch electrode areas can be spaced apart from one another in a second direction Y intersecting the first direction X.

The first and second touch electrodes TE1 and TE2 can be disposed on the same layer. The first and second touch electrodes TE1 and TE2 can be spaced apart from one another with a sensing area therebetween and can be electrically insulated from one another. The second touch electrodes TE2 spaced apart from one another in the second direction Y can be electrically connected to the bridge electrode BE through the bridge contact hole BCH provided in the touch insulation layer 131. Therefore, the second touch electrodes TE2 spaced apart from one another in the second direction Y can be electrically connected to one another through the bridge electrode BE, and thus, the first and second touch electrodes TE1 and TE2 can be insulated from one another without being short-circuited, in an intersection area of the first and second touch electrodes TE1 and TE2.

The first and second touch electrodes TE1 and TE2, and the bridge electrodes, according to an embodiment can each include a mesh pattern where a plurality of metal lines each having a very thin line width intersect one another. The mesh pattern according to an embodiment can have a single-layer structure or a multilayer structure including a metal material such as Mo, Ag, Ti, Cu, Al, Ti/Al/Ti, or Mo/Al/Mo. The mesh pattern can be disposed to overlap the bank 117 so as to prevent the opening area OA of each pixel P from being reduced. The first touch electrodes TE1 and the second touch electrodes TE2 can each have a mesh pattern structure and can each have a polygonal shape (for example, a lozenged or rhombic shape). In this case, the first touch electrodes TE1 and the second touch electrodes TE2 arranged in a corner of the touch electrode layer 130 can each have a triangular shape. The mesh pattern can comprise a plurality of mesh openings or holes corresponding to the opening area OA of each pixel.

According to another embodiment, the first touch electrodes TE1 and the second touch electrodes TE2 can each have a line shape or a polygonal shape (for example, a lozenged or rhombic shape).

The planarization layer 140 can be provided on the substrate 100 to cover the touch electrode layer 130 and can provide a flat surface on the touch electrode layer 130. The planarization layer 140 according to an embodiment can be provided to have a relatively thick thickness, so as to cover the first and second touch electrodes TE1 and TE2 and the touch insulation layer 131, and thus, can planarize a step height caused by each of the electrodes of the touch electrode layer 130. The planarization layer 140 according to an embodiment can be formed of one organic material of polyacrylates resin, epoxy resin, phenolic resin, polyamide resin, polyimide resin, and benzocyclobutene resin. For example, the planarization layer 140 can include polyacrylates resin. The planarization layer 140 can be formed through a coating process of coating the polyacrylates resin on the touch electrode layer 130 and a curing process of curing the coated polyacrylates resin at a temperature of 100 degrees C. or less.

The insulation layer 150 can include a molecule-adsorbing material and can be provided on the planarization layer 140. The insulation layer 150 can adsorb (or absorb) water to prevent the water from penetrating into the functional film 170, thereby reinforcing a moisture resistance of the display apparatus with integrated touch screen. Also, the insulation layer 150 can additionally adsorb an outgas fume of the planarization layer 140 to prevent the outgas fume from penetrating into the functional film 170. To this end, the insulation layer 150 according to an embodiment of the present disclosure can include an organic material including a molecule-adsorbing material. The molecule-adsorbing material included in (added to) the organic material can be set by 5% of the volume of the insulation layer 150 or less. In other words, the molecule-adsorbing material makes up 5% of the total volume of the insulation layer 150. Here, when the molecule-adsorbing material included in the organic material exceeds 5%, the insulation layer 150 can expand based on the amount of water and/or outgas fume adsorbed by the molecule-adsorbing material, causing a reduction in reliability.

The organic material of the insulation layer 150 can include an acrylate-based material or a siloxane-based material.

The molecule-adsorbing material according to an embodiment can include a fluorine-based composition. For example, the molecule-adsorbing material including the fluorine-based composition can include Du Pont company's trademark (Nafion) molecular sieves. Here, the Nafion molecular sieves can be materials produced by hydrolyzing a perfluorosulfonic acid and can have a molecular structure represented by the following Chemical Formula 1. In the Nafion molecular sieves which are fluorine-based compositions, an end group "SO3-" can react with water molecules to adsorb polar water molecules. Also, the Nafion molecular sieves can additionally adsorb a polar outgas fume (for example, an acid composition) of the planarization layer 140, based on heat.

[Chemical Formula 1]

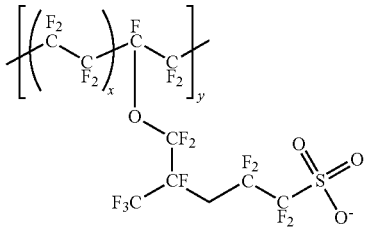

The insulation layer 150 according to an embodiment can be formed on the planarization layer 140 to have a thickness of 2 μm to 3 μm through the same coating process and curing process as a process of forming the planarization layer 140.

The film adhesive member 160 can be disposed between the insulation layer 150 and the functional film 170 and can couple the functional film 170 to the insulation layer 150. That is, the film adhesive member 160 can be for laminating the functional film 170 on a front surface of the insulation layer 150 and can include a pressure sensitive adhesive, an optically clear adhesive, or an optically clear resin.

The functional film 170 can be attached on the front surface of the insulation layer 150 by the film adhesive member 160. The functional film 170 according to an embodiment can include a polarizing film. The polarizing film can circularly polarizes external light reflected by the TFTs and/or pixel driving lines provided on the pixel array layer 110, thereby enhancing the visibility and contrast ratio of the display apparatus. According to another embodiment, the functional film 170 can include at least one of a polarizing film, a barrier film, an anti-reflection film, and a transmittance controllable film.

The display apparatus with integrated touch screen according to an embodiment of the present disclosure can further include a window cover 190.

The window cover 190 can be attached on a front surface of the functional film 170 by a cover adhesive member 180. The window cover 190 according to an embodiment can include a plastic material, a metal material, or a glass material. In this case, the window cover 119 including the glass material can include one of sapphire glass and gorilla glass or a junction structure thereof. For example, the window cover 190 can include the gorilla glass which is relatively high in durability.

The cover adhesive member 180 can be for laminating the window cover 190 on a front surface of the functional film 170 and can include a pressure sensitive adhesive, an optically clear adhesive, or an optically clear resin.

The display apparatus with integrated touch screen according to an embodiment of the present disclosure can further include a black matrix and a wavelength conversion layer which are provided on the touch electrode layer 130.

The black matrix can define an opening area OA of each pixel P and can be provided on the planarization layer 140 to overlap the bank 117.

The wavelength conversion layer can be provided in the opening area OA, defined by the black matrix, on the planarization layer 140.

The wavelength conversion layer according to an embodiment can include a color filter which transmits only a wavelength of a color, set in a pixel, of white light incident from the light emitting device 116 of each pixel P. For example, the wavelength conversion layer can transmit only a wavelength of red, green, or blue.

According to another embodiment, the wavelength conversion layer can include a quantum dot having a size which re-emits light based on the white light incident from the light emitting device 116 of each pixel P to emit light of a color set in a pixel. Here, the quantum dot can be selected from among CdS, CdSe, CdTe, ZnS, ZnSe, GaAs, GaP, GaAs—P, Ga—Sb, InAs, InP, InSb, AlAs, AlP, and AlSb. For example, a quantum dot including CdSe or InP can emit red light, a quantum dot including CdZnSeS can emit green light, and a quantum dot including ZnSe can emit blue light. In this manner, when the wavelength conversion layer includes the quantum dot, a color reproduction rate increases.

According to another embodiment, the wavelength conversion layer can include a color filter including a quantum dot.

In the present embodiment where the wavelength conversion layer is provided, the light emitting device layer EDL can be provided in common in each pixel P, and thus, a manufacturing process is simplified.

In the display apparatus with integrated touch screen according to an embodiment of the present disclosure, the light emitting layer EL of the light emitting device 116 provided as part of the light emitting device layer EDL can be divided into a red light emitting layer, a green light emitting layer, and a blue light emitting layer. In this case, the red light emitting layer, the green light emitting layer, and the blue light emitting layer can not be provided in common in each pixel P and can be individually provided in a pixel having a corresponding color. Accordingly, the black matrix and the wavelength conversion layer can be omitted.

In the display apparatus with integrated touch screen according to an embodiment of the present disclosure, water flowing in from the outside and the outgas fume emitted from the planarization layer 140 can be adsorbed by the molecule-adsorbing material added to the insulation layer 150, and thus, the adhesive force of the film adhesive member 160 is prevented from being reduced by the water and the outgas fume, thereby maintaining the adhesive force of the film adhesive member 160. Also, since the adhesive force of the film adhesive member 160 is maintained, a crack is prevented from occurring when the functional film 170 is bent and the adhesive force of the film adhesive member 160 is reduced due to heat, thereby enhancing a moisture resistance and reliability.

Figure 3:
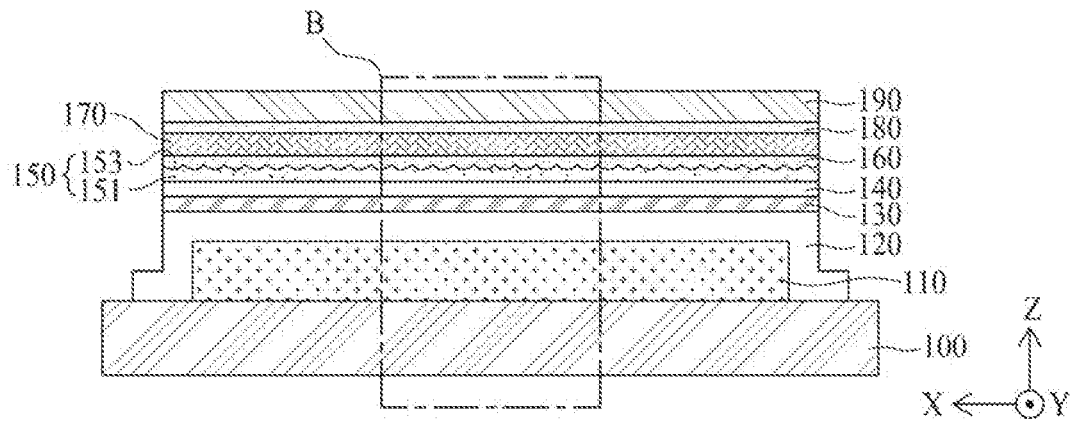
FIG. 3 is a cross-sectional view schematically illustrating a display apparatus with integrated touch screen according to an embodiment of the present disclosure.
Figure 4:
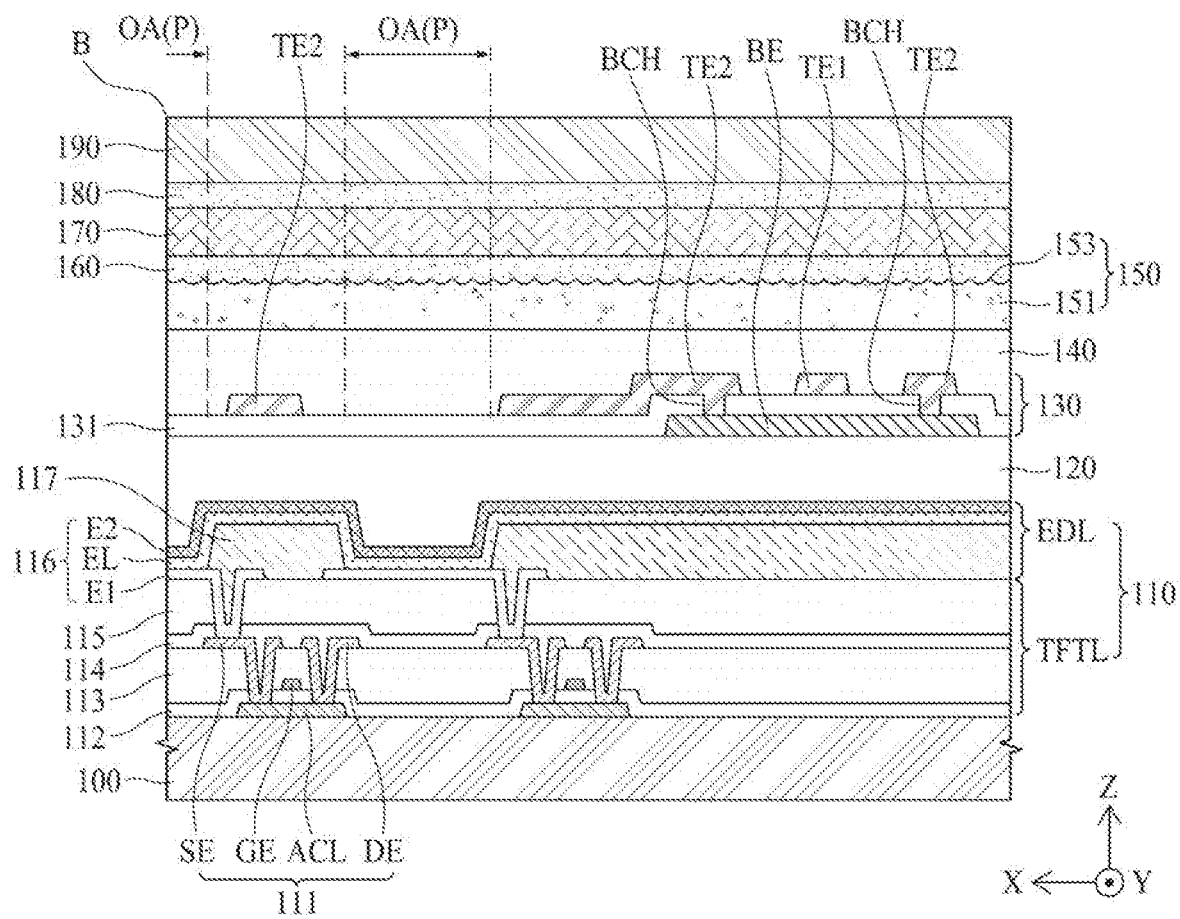
FIG. 4 is an enlarged view of a portion B illustrated in FIG. 3.
Figure 5:
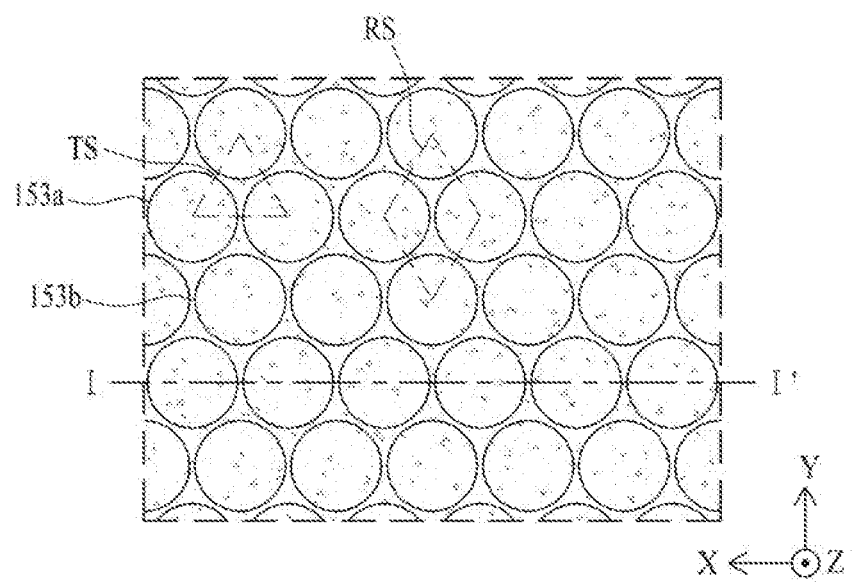
FIG. 5 is a plan view of an example of an insulation layer illustrated in FIG. 4.
Figure 6:
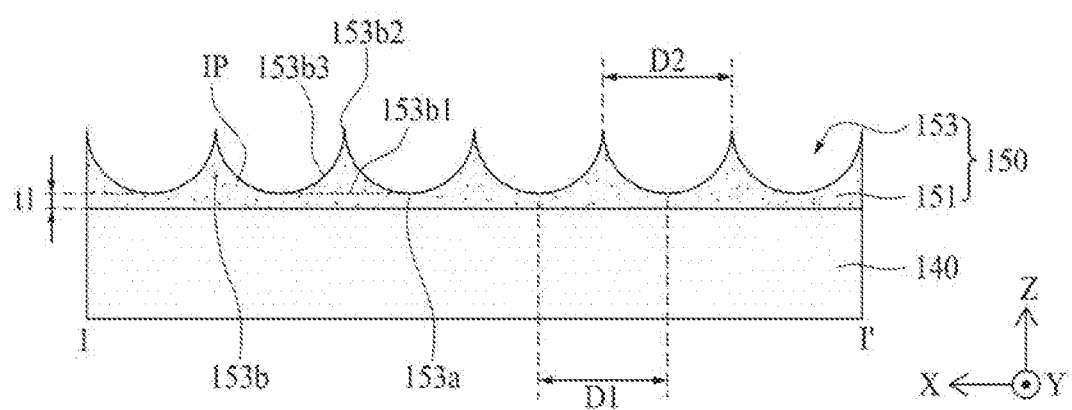
FIG. 6 is a cross-sectional view taken along line I-I' illustrated in FIG. 5.

FIG. 3 is a cross-sectional view schematically illustrating a display apparatus with integrated touch screen according to an embodiment of the present disclosure. FIG. 4 is an enlarged view of a portion B illustrated in FIG. 3. FIG. 5 is a plan view of an insulation layer illustrated in FIG. 4. FIG. 6 is a cross-sectional view taken along line I-I' illustrated in FIG. 5. The display apparatus with integrated touch screen according to the present embodiment can be configured by modifying a structure of the insulation layer illustrated in FIGS. 1 and 2. Hereinafter, therefore, only an insulation layer and elements relevant thereto will be described, and overlapping descriptions of the other elements are omitted or will be brief.

Referring to FIGS. 3 to 6, an insulation layer 150 according to the present embodiment can include a base layer 151 and a non-flat surface 153.

The base layer 151 can include a molecule-adsorbing material and is the same as the insulation layer illustrated in FIGS. 1 and 2, and thus, its overlapping description is omitted or will be brief.

The non-flat surface 153 can be provided at an interface between the insulation layer 150 and a film adhesive member 160. For example, the non-flat surface 153 can be provided as part of a surface of the base layer 151. The non-flat surface 153 can be defined as a concave-convex surface or a scattering surface. The non-flat surface 153 can increase a surface area of the insulation layer 150 to increase an adhesive surface area of the film adhesive member 160, thereby increasing an adhesive force between the insulation layer 150 and the film adhesive member 160. Also, the non-flat surface 153 can act as a scattering surface at the interface between the insulation layer 150 and the film adhesive member 160 to scatter light emitted from a light emitting device layer EDL of each of a plurality of pixels P provided on a pixel array layer 110, thereby increasing a light extraction efficiency of light extracted to the outside of a window cover 190.

The non-flat surface 153 according to an embodiment can include a micro lens pattern provided on a surface of the base layer 151. The micro lens pattern can include a plurality of concave portions 153a and a partition wall 153b.

Each of the plurality of concave portions 153a can be concavely provided to have a cross-sectional structure having a curve shape from the surface of the base layer 151. Each of the plurality of concave portions 153a according to an embodiment can have a cross-sectional structure of a concave lens. For example, each of the plurality of concave portions 153a can have a cross-sectional structure having a semicircular shape.

The plurality of concave portions 153a can be arranged at certain intervals in parallel along a first direction X and can be arranged in a zigzag form along a second direction Y. That is, the plurality of concave portions 153a can be arranged in a matrix form having a certain interval, and in this case, adjacent concave portions 153a can be disposed so as to be misaligned in the second direction Y. Therefore, center portions of three adjacent concave portions 153a can form a triangular shape TS. Also, the plurality of concave portions 153a can two-dimensionally have a honeycomb structure.

The plurality of concave portions 153a can have the same depths with respect to a front surface of a planarization layer 140, but some of the plurality of concave portions 153a can have different depths due to a process error in a patterning process. Floors of the plurality of concave portions 153a can be spaced apart from a front surface of the planarization layer 140 by 0.1 μm to 1 μm, for preventing a portion of the front surface of the planarization layer 140 from being directly exposed at the concave portions 153a in a patterning process of patterning the insulation layer 150. For example, a thickness t1 between the floor of each of plurality of concave portions 153a and the front surface of the planarization layer 140 can be set to 0.1 μm to 1 μm.

For example, when a portion of the front surface of the planarization layer 140 is directly exposed at the concave portion 153a, the portion of the front surface of the planarization layer 140 directly contacts the film adhesive member 160, and for this reason, an adhesive force of the film adhesive member 160 is reduced by an outgas fume which is emitted from the planarization layer 140 due to heat.

The partition wall 153b can be provided to surround each of the plurality of concave portions 153a. The partition wall 153b can two-dimensionally have a hexagonal shape. The partition wall 153b can have a cutting-edge structure or a convex structure, based on an interval D1 between the plurality of concave portions 153a. For example, when the interval D1 between the plurality of concave portions 153a is the same as a diameter D2 of each of the plurality of concave portions 153a, the partition wall 153b can have the cutting-edge structure. As another example, when the interval D1 between the plurality of concave portions 153a is greater than the diameter D2 of each of the plurality of concave portions 153a, the partition wall 153b can have the convex structure. The structure of the partition wall 153b can be determined based on the interval D1 between the plurality of concave portions 153a and the diameter D2 of each of the plurality of concave portions 153a for increasing a surface area of the insulation layer 150 and light extraction efficiency.

The partition wall 153b can include a bottom portion 153b1, a top portion 153b2, and a side portion 153b3 which are provided based on each of the plurality of concave portions 153a. In the case that the partition wall 153b has the convex structure, the partition wall 153b can have a Bell or Gaussian-curve cross-sectional structure.

The bottom portion 153b1 can be defined as a floor of a concave portion 153a adjacent to the planarization layer 140. For example, the bottom portion 153b1 can be spaced apart from the front surface of the planarization layer 140 by 0.1 μm to 1 μm. A diameter (or a width) of the bottom portion 153b1 can be set based on an aspect ratio of the partition wall 153b based on a height and bottom diameter of the partition wall 153b.

The top portion 153b2 can be spaced apart from the bottom portion 153b1 by a predetermined height. The top portion 153b2 can be defined as a vertex of the partition wall 153b, which can have the cutting-edge structure shown in FIG. 6, or can have the convex structure.

The side portion 153b3 can be provided in curve shape between the bottom portion 153b1 and the top portion 153b2. The side portion 153b3 according to an embodiment can include a midpoint IP, a first curve portion between the mid-point and the bottom portion 153b1, and a second curve portion between the mid-point and the top portion 153b2. The side portion 153b3 can include a concave surface, as shown in FIG. 6, and both the first curve portion and the second curve portion can be concave. Alternatively, the side portion 153b3 can include both a concave surface and a convex surface. In this case, the first curve portion between the mid-point IP and the bottom portion 153b1 can be the concave surface, and the second curve portion between the mid-point IP and the top portion 153b2 can be the convex surface. As such, in this arrangement the mid-point IP is an inflection point. Therefore, a traveling path of light incident on the side portion 153b3 including the inflection point can be changed at various angles by each of the concave surface and the convex surface, thereby enhancing a light extraction efficiency of each pixel.

The insulation layer 150 according to the present embodiment can be coupled to a functional film 170 by the film adhesive member 160. In this case, the film adhesive member 160 can be attached on a non-flat surface (or a scattering surface) 153 provided on the insulation layer 150, and thus, an adhesive area of the film adhesive member 160 can increase, thereby increasing an adhesive force between the film adhesive member 160 and the insulation layer 150.

As described above, the display apparatus with integrated touch screen according to the present embodiment has the same effect as that of the display apparatus illustrated in FIGS. 1 and 2. Also, in the display apparatus with integrated touch screen according to the present embodiment, an adhesive force between the film adhesive member 160 and the insulation layer 150 increases by using the non-flat surface 153 provided on the insulation layer 150, thereby enhancing a light extraction efficiency of each pixel.

Figure 7:
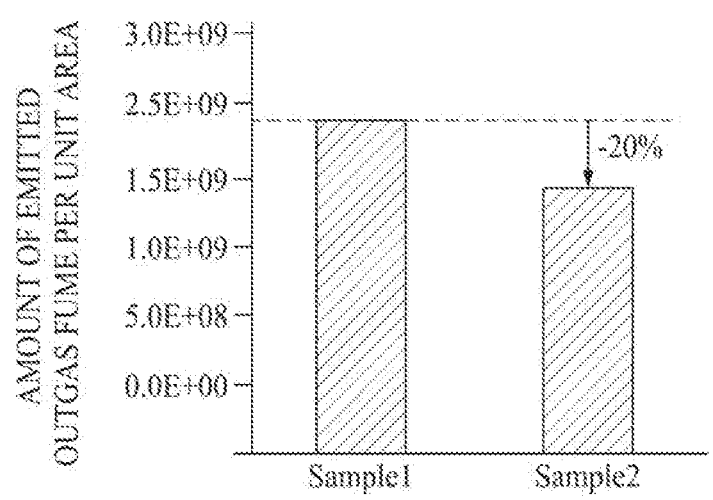
FIG. 7 is a graph showing a result obtained by measuring an outgas fume characteristic of a single organic layer according to an embodiment of the present disclosure and an outgas fume characteristic of a single organic layer of a comparative example.

FIG. 7 is a graph showing a result obtained by measuring an outgas fume characteristic of a single organic layer according to an embodiment of the present disclosure and an outgas fume characteristic of a single organic layer of a comparative example. In FIG. 7, after a single organic layer (Sample 1), to which a molecule-adsorbing material is not added, of the comparative example and a single organic layer (Sample 2), to which a molecule-adsorbing material is added by 5% or less, of the present disclosure are cured, the outgas fume characteristics have been obtained by measuring the amount of emitted outgas fume per unit area while the cured single organic layers are being reheated at a temperature of 2,300 degrees C.

As seen in FIG. 7, in comparison with the single organic layer (Sample 1) of the comparative example, it can be confirmed that in the single organic layer (Sample 2) of the present disclosure, the amount of emitted outgas fume is reduced by about 20%.

Therefore, according to the present disclosure, an insulation layer including an organic material with a molecule-adsorbing material added thereto can be disposed between a planarization layer and a film adhesive member, and thus, an adhesive force of the film adhesive member is prevented from being reduced by an outgas fume which is emitted from the planarization layer by heat.

The display apparatus with integrated touch screen according to the embodiments of the present disclosure can be applied to televisions (TVs), wall paper TVs, monitors, notebook computers, smartphones, tablet computers, electronic pads, wearable devices, foldable devices, rollable devices, bendable devices, flexible devices, curved devices, watch phones, portable information devices, navigation devices, vehicle control display apparatuses, etc.

The above-described features, structures, and effects of the present disclosure are included in at least one embodiment of the present disclosure, but are not limited to only one embodiment. Furthermore, the features, structures, and effects described in at least one embodiment of the present disclosure can be implemented through combination or modification of other embodiments by those skilled in the art. Therefore, contents associated with the combination and modification should be construed as being within the scope of the present disclosure.

As described above, in the display apparatus with integrated touch screen, a problem where the adhesive force of the film adhesive member is reduced by the outgas fume is solved, and thus, a crack which occurs in the film adhesive member due to the reduction in the adhesive force is prevented, thereby enhancing a moisture resistance and reliability.

It will be apparent to those skilled in the art that various modifications and variations can be made in the present disclosure without departing from the scope of the disclosures. Thus, it is intended that the present disclosure covers the modifications and variations of this disclosure provided they come within the scope of the appended claims.

What is claimed is:

1. A display apparatus with integrated touch screen, the display apparatus comprising:
   a pixel array layer on a substrate;
   an encapsulation layer directly on the pixel array layer for covering an upper surface and a side surface of the pixel array layer, the encapsulation layer including a first inorganic encapsulation layer surrounding the pixel array layer, an organic encapsulation layer covering the first inorganic encapsulation layer, and a second inorganic encapsulation layer covering the organic encapsulation layer;
   a touch electrode layer directly contacting an upper surface of the encapsulation layer, the touch electrode layer including:
      a plurality of bridge electrodes directly on the encapsulation layer;
      a touch insulation layer on the plurality of bridge electrodes; and
      a plurality of touch electrodes on the touch insulation layer;
   a planarization layer on the plurality of touch electrodes;
   an insulation layer on the planarization layer; and
   a functional film attached on the insulation layer by a film adhesive member,
   wherein the insulation layer is disposed between the planarization layer and the functional film, and comprises:
      a scattering surface including a micro lens pattern; and
      a base layer including a molecule-adsorbing material,
   wherein the micro lens pattern includes a plurality of concave portions each having a semicircular shape having a cross-sectional structure of a concave lens, and at least one partition wall, the plurality of concave portions being arranged in parallel along a first direction and in a zigzag form along a second direction that is perpendicular to the first direction in a plan view of the insulation layer, and center portions of three adjacent concave portions among the plurality of concave portions form a shape of an equilateral triangle, wherein the plurality of touch electrodes include a plurality of first touch electrodes and a plurality of second touch electrodes on the touch insulation layer, wherein the plurality of first touch electrodes and the plurality of second touch electrodes are disposed between the touch insulation layer and the planarization layer, and wherein a thickness of the organic encapsulation layer is thicker than a thickness of the first inorganic encapsulation layer.

2. The display apparatus of claim 1, wherein the plurality of touch electrodes and the plurality of bridge electrodes each comprises a mesh pattern.

3. The display apparatus of claim 1, wherein the molecule-adsorbing material adsorbs water molecules.

4. The display apparatus of claim 3, wherein the molecule-adsorbing material comprises a fluorine-based composition.

5. The display apparatus of claim 1, wherein the molecule-adsorbing material adsorbs an outgas fume of the planarization layer.

6. The display apparatus of claim 1, wherein the film adhesive member comprises a pressure sensitive adhesive, an optically clear adhesive, or an optically clear resin.

7. The display apparatus of claim 1, wherein the planarization layer comprises one of polyacrylates resin, epoxy resin, phenolic resin, polyamide resin, polyimide resin, and benzocyclobutene resin.

8. The display apparatus of claim 1, wherein the functional film comprises a polarizing film.

9. The display apparatus of claim 1, wherein the scattering surface is a non-flat surface providing an interface between the insulation layer and the film adhesive member.

10. The display apparatus of claim 1, wherein the film adhesive member is attached on the scattering surface.

11. The display apparatus of claim 1,
wherein the film adhesive member is attached to the micro lens pattern of the scattering surface.

12. The display apparatus of claim 1, wherein the at least one partition wall is disposed between adjacent concave portions of the plurality of concave portions.

13. The display apparatus of claim 1, wherein the molecule-adsorbing material added to the insulation layer is 5% or less of a total volume of the insulation layer.

14. The display apparatus of claim 1, wherein the at least one partition wall is disposed between two adjacent concave portions among the plurality of concave portions, and
wherein the at least one partition wall has a tapered shape that terminates in a cutting-edge that points away from the base layer.

15. The display apparatus of claim 1, wherein the planarization layer includes a flat upper surface contacting a lower surface of the base layer and a non-flat lower surface contacting the plurality of touch electrodes and an upper surface of the touch insulation layer.

16. A display apparatus with integrated touch screen, the display apparatus comprising:
a pixel array layer on a substrate;
an encapsulation layer on the pixel array layer for surrounding the pixel array layer, the encapsulation layer including a first inorganic encapsulation layer surrounding the pixel array layer, an organic encapsulation layer covering the first inorganic encapsulation layer, and a second inorganic encapsulation layer covering the organic encapsulation layer;
a touch electrode layer disposed on an upper surface of the encapsulation layer, the touch electrode layer including:
a touch buffer layer directly on the encapsulation layer;
a plurality of bridge electrodes on the touch buffer layer;
a touch insulation layer on the plurality of bridge electrodes; and
a plurality of touch electrodes on the touch insulation layer;
a planarization layer on the plurality of touch electrodes;
an insulation layer on the planarization layer; and
a functional film attached on the insulation layer by a film adhesive member,
wherein the insulation layer disposed between the planarization layer and the functional film comprises:
a scattering surface including a micro lens pattern; and
a base layer including a molecule-adsorbing material,
wherein the micro lens pattern includes a plurality of concave portions each having a semicircular shape having a cross-sectional structure of a concave lens, and at least one partition wall, the plurality of concave portions being arranged in parallel along a first direction and in a zigzag form along a second direction that is perpendicular to the first direction in a plan view of the insulation layer, and center portions of three adjacent concave portions among the plurality of concave portions form a shape of an equilateral triangle,
wherein the plurality of touch electrodes includes a plurality of first touch electrodes and a plurality of second touch electrodes on the touch insulation layer,
wherein the plurality of first touch electrodes and the plurality of second touch electrodes are disposed between the touch insulation layer and the planarization layer, and
wherein a thickness of the organic encapsulation layer is thicker than a thickness of the first inorganic encapsulation layer.

17. The display apparatus of claim 16, wherein the at least one partition wall is disposed between two adjacent concave portions among the plurality of concave portions, and
wherein the at least one partition wall has a tapered shape that terminates in a cutting-edge that points away from the base layer.

18. The display apparatus of claim 16, wherein the planarization layer includes a flat upper surface contacting a lower surface of the base layer and a non-flat lower surface contacting the plurality of touch electrodes and an upper surface of the touch insulation layer.

* * * * *